United States Patent [19]

Ahrens et al.

[11] Patent Number: 4,793,702
[45] Date of Patent: Dec. 27, 1988

[54] EYEGLASS STEM HOLDER

[76] Inventors: William C. Ahrens; Sandra L. Ahrens, both of P.O. Box 70, Palo Cedro, Calif. 96073-0070

[21] Appl. No.: 897,910

[22] Filed: Aug. 19, 1986

Related U.S. Application Data

[63] Continuation-in-part of Ser. No. 791,076, Oct. 24, 1985, abandoned.

[51] Int. Cl.[4] .............................................. G02C 3/02
[52] U.S. Cl. ..................................... 351/157; 351/156
[58] Field of Search ................ 351/122, 123, 156, 157

[56] References Cited

U.S. PATENT DOCUMENTS

| | | | |
|---|---|---|---|
| 619,163 | 2/1899 | Gieberich | 351/123 |
| 1,819,738 | 8/1931 | Daniels | 351/156 |
| 4,133,604 | 1/1979 | Fuller | 351/156 |
| 4,541,696 | 9/1985 | Winger et al. | 351/123 |
| 4,657,364 | 4/1987 | Murrell | 351/156 |

Primary Examiner—Rodney B. Bovernick
Assistant Examiner—Jay Ryan

[57] ABSTRACT

An eyeglass retainer which is an elongated band of stretchable material formed to have a pair of oppositely positioned tubes, each of which tubes can receive a portion of an eyeglass frame. The tubes are formed from two materials of differing stretchability to promote the gripping of the eyeglass frame inserted therein. The innermost ends of the tube may be sealed to prevent the eyeglass frame from passing completely through the tube. The sealing of the innermost tube end provides a self adjusting eyeglass retainer.

6 Claims, 2 Drawing Sheets

EYEGLASS STEM HOLDER

This is a continuation-in-part application of U.S. Ser. No. 791,076, filed Oct. 24, 1985 now abandoned.

BACKGROUND OF THE INVENTION

This invention relates generally to devices for retaining eyeglass frames to wearer's heads and more particularly to a uniquely simple and effective retainer easily attached to different size frames, without adjustment.

In the past, various retention devices have been employed, as are exemplified by U.S. Pat. No. 4,133,604. Such prior devices are either too complex, insufficiently adaptable to different frames, or unreliable in that the frame stem gripping portions tear apart or destruct in use, or slip relative to the stems due to loose fit of the retainer on the frame. Furthermore, presently available eyeglass retainers can be improperly fitted by the user onto the frames. This lack of proper fitting is due to the fact that the retaining tubular portion of some eyeglass retainers can be positioned anywhere along the eyeglass stem. This results in the retainer being pulled tight about a wearer's head which can potentially damage the retainer and eyewear and possibly lead to headaches. There is thus a need for a retainer characterized by low cost, simple construction, reliability, without destructing of their stem gripping extents, as for example at the ends of stem gripping tubes. There is also a need to provide a retainer which self adjusts on the eyeglass frame to prevent improper fitting to the frame by the wearer.

SUMMARY OF THE INVENTION

It is a major object of the invention to provide an improved retainer meeting the above need. Basically, the improved retainer comprises:

an elongated band of at least lengthwise stretchable material of sufficient length to extend about the back of the wearer's head, said band having opposite longitudinally disposed ends manipulated to form tubular shaped members for a predetermined length along said band length;

a retention sheet bonded about said tubular shaped members to hold said tubular shape of said members; and wherein the material from which the band is made is sufficiently more stretchable than the material from which the retention sheet is made to provide a cooperative interaction between these materials so that the tubular shaped members will grip an eyeglass frame passed therethrough.

As will appear, the retainer including the tubes, with unusual advantage, can be prepared from a single layer of elastomeric foam to which sealing sheets may be heat sealed at the tube terminals, the sheet consisting of a thin fabric material positioned on the tube exterior. The band being stretchable enables each stretchable and securely formed tube to stretch open when the spectacle's stem is inserted through it. The difference in stretchability between the tube and the retention sheet enables the band to securely grip and resist endwise movement on the eyeglass stem. The ends of the tube are free from tearing. In operation the retention sheets will cause the tube terminals to be compressed into a gripping relation with the frame stems as the tubes are stretched.

The eyeglass retainer may be made self-adjusting by closing off the innermost end of each tube. This prevents the eyeglass frame from passing through the tube.

These and other objects and advantages of the invention, as well as the details of an illustrative embodiment, will be more fully understood from the following specification and drawings, in which:

DRAWING DESCRIPTION

DETAILED DESCRIPTION

The invention is directed to a strap detachably mounted to eyeglasses for retaining the eyeglasses on a wearer's head.

Referring to FIGS. 1-6, the retainer 11 is formed from an elongated band 10, which is lengthwise stretchable, and may also be widthwise stretchable; also it is compressible in its thickness dimension. The band 10 may consist, advantageously of a relatively thick strip of closed or open cell compressible foam. One example is foamed NEOPRENE. The foam has a thickness "d" between about 1/16 and 3/16 inches. The band is about 10 to 16 inches long, and its width $t_1$ is between ½ and 1 inch. The band may 10 be provided on one or both of opposing surfaces with elastic webbing.

Figure 1:
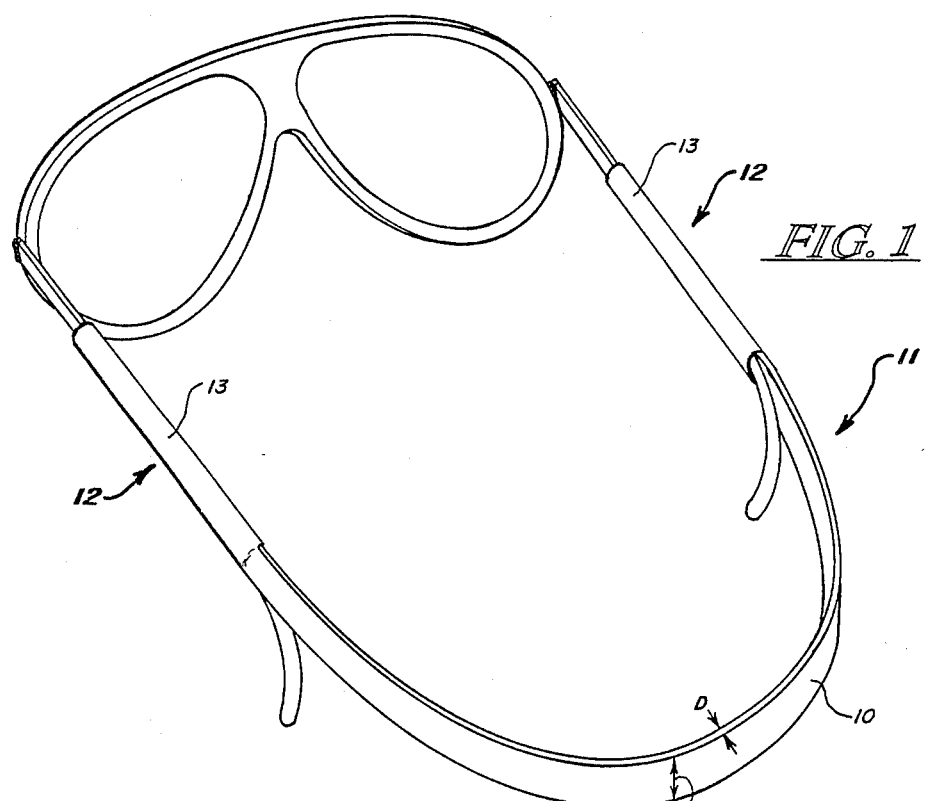
FIG. 1 is a plan view of a band incorporating the invention.
Figure 2:
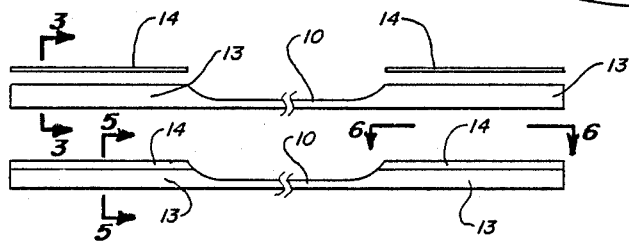
FIG. 2 is an enlarged side elevation of the band prior to bonding of the retention sheets to the tube terminals.
Figure 4:
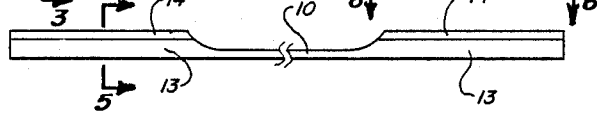
FIG. 4 is a view like FIG. 2, taken after bonding of the retention sheets to the tube terminals.
Figure 3:
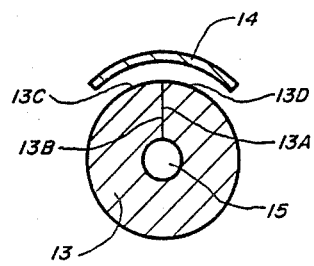
FIG. 3 is an enlarged end view of lines 3—3 of FIG. 2.
Figure 5:
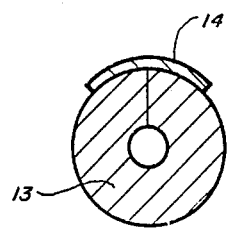
FIG. 5 is an enlarged end view on lines 5—5 of FIG. 4.
Figure 6:
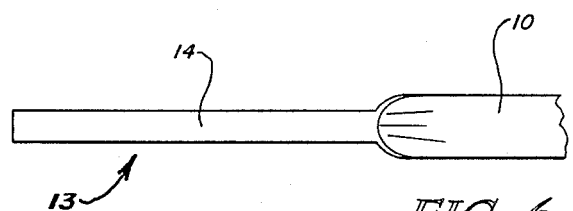
FIG. 6 is an enlarged plan view on lines 6—6 of FIG. 4.

The band 10 has end portions 12 which initially extend in the same plane as the band extent between such end portions. Each of such end portions is folded to define an elongated tube 13 having elongated terminals 13a and 13b extending in an adjacent relation. In FIGS. 3 and 5 the terminals extend in abutting relation. A stretchable retention sheet 14 is positionable about the tube 13 exterior surfaces 13c and 13d. The sheet 14 can extend completely or partially about the tube 13. Preferably, the sheet 14 will extend about the tube 13 to form an angle between two intersecting planes which lie along the longitudinal edges of the sheet 14, as seen in FIGS. 3 and 5. This angle is typically greater than about 30 degrees, preferably from about 30 degrees to 180 degrees, and more preferably about 75 degrees to about 180 degrees. The sheet 14 is bonded to the surfaces 13c and 13d, as for example, by heat sealing of interengaged surfaces, whereby the terminals are joined together. Preferably, when the band 10 is provided with a webbing on only one side, the band 10 is folded to form the tube 13 with the webbing positioned on the exterior surface of the tube 13.

In one embodiment, each tube 13 is configured to pass an eyeglass frame stem by outward stretching of inner surface 15, so as to grip the stem when the band 10 is stretched about the wearer's head, exerting endwise force on the tubes 13 and tending to further collapse them on the stems, as will be discussed below. This is further accommodated by the stretchable sheets 14 which hold the terminals 13a and 13b together while the tubes and sheets stretch, as referred to. It is found that the sheets 14 do not tear free of the surfaces 13c and 13d, but stretch therewith as required.

It has been found that when the sheet 14, which is used to hold the ends 12 as tubes 13, is of a material which less stretchable than the material from which the band 10 is made an unexpected beneficial result occurs. The unexpected benefit is the cooperative interaction between the sheet 14 and tube 13 as an eyeglass frame stem is passed through the tubes 13. This cooperative interaction between these materials allows the tubes 13 to grip the eyeglass frame stems more tightly than if the two materials stretched comparatively, or if the tube 13 was formed by bonding the terminals 13a and 13b together with an adhesive or by stitching. It is believed that the type of grip provided by this difference in stretchability is generally referred to as "ridge gripping". Ridge gripping is believed to occur when the material, forming the tube 13, bunches up or forms ridges due to the difference in stretchability between the materials of the band 10 and sheet 14. This type of grip is greater than the grip provided by the mere constriction of the tube 13 about the eyeglass frame as the tube 13 is stretched.

It should be noted that while the difference in stretchability of the materials of the tube 13 and sheet 14 provides for a greater gripping action than accomplished with presently available retainers, e.g., those disclosed by U.S. Pat. No. 4,133,604, the present invention should not be limited to any precise type of gripping action. That is, the discussion regarding "ridge gripping" is only a theory and, as such, the invention should not be limited by such theory.

The precise difference in stretchability is not critical, so long as the material forming each of the tubes 13 is more stretchable than the material forming the sheets 14.

The band 10, and thus the tubes 13, is formed from an open or closed cell compressible foamed polymer, preferably an elastomeric polymer, e.g. neoprene. The retention sheets 14 may be formed from any suitable material, e.g., nylon, polyester or other equivalent material, preferably a nylon jersey or tricot.

While the retention sheets 14 may be bonded to the surfaces 13c and 13d by any suitable adhesive, it is preferred that the adhesives used are those of the type generally referred to as thermal setting adhesives, e.g. a polyurethane adhesive. Typically, an adhesive of this type will be applied to a surface of the retention sheet 14. The sheet 14 is then positioned about the tube 13 with heat and pressure applied thereto bonding the sheet 14 to the tube 13. This manner of bonding the retention sheets 124 to the surfaces 13c and 13d of the tube 13 ensures a substantial adhesion in comparison to the manner of manufacturing those presently available eyeglass retainers as taught by the U.S. Pat. No. 4,133,604, i.e. stitching the tube together.

Examples of particularly useful materials from which retention sheet 14 may be prepared are nylon tapes sold under the trademark "Meico" T5000 and T8100, by Texmark Incorporated (a subsidiary of C. Itoh) of Charlotte, N.C., which nylon tape is manufactured by San Chemical, Ltd., San Kasei K.K., 153, Fuedo, Shinjocho, Nara, 639-21 Japan. This nylon tape is provided along one surface with a thermal setting adhesive.

Figure 7:
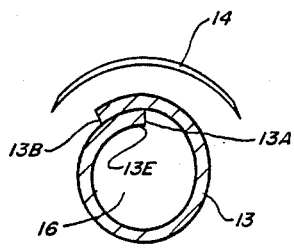
FIGS. 7 and 8 are enlarged views like FIGS. 3 and 5 showing another modification.
Figure 8:
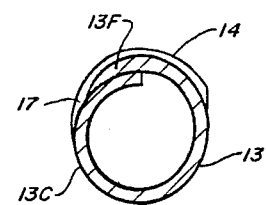

In FIGS. 7 and 8 the tube terminals 13a and 13b do not extend in abutting relation, but rather terminal 13b overlays surface 13c, and terminal 13a is exposed to the tube interior 16 so that edge 13e assists in gripping the eyeglass stem. Sheet 14 is bonded to surface 13a as before, and also compresses terminal 13b, in FIG. 8 to tapered shape at 13f, outwardly of surface 13c. The edge extent of the sheet is bonded to surfaces 13c, at 17. In FIGS. 5 and 8 the tubes are generally cylindrical.

Figure 9:
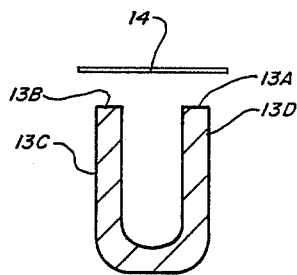
FIGS. 9 and 10 are enlarged views like FIGS. 3 and 5 showing still another embodiment.
Figure 10:
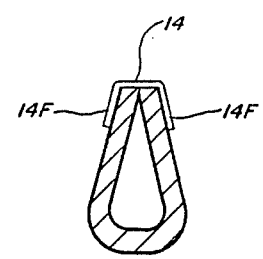

In FIGS. 9 and 10 the tube 13 is U-shaped; and terminals 13a and 13b extend in side-by-side, co-planar relation. Sheet 14 has one side thereof bonded to both terminals, and is also folded at 14f to be bonded to the tube outer surfaces 13c and 13d, as shown.

Figure 11:
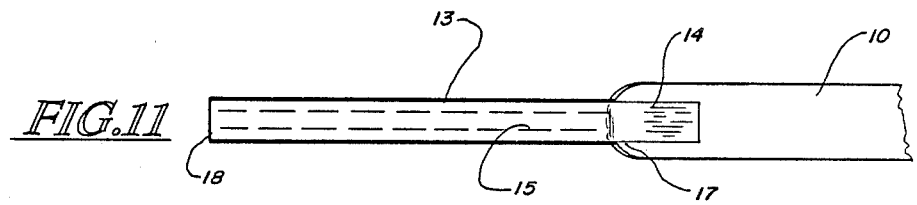
FIG. 11 is a side elevational view of a tube portion of a retainer formed in accordance with another embodiment of the invention wherein the innermost end of the tube is closed.
Figure 12:
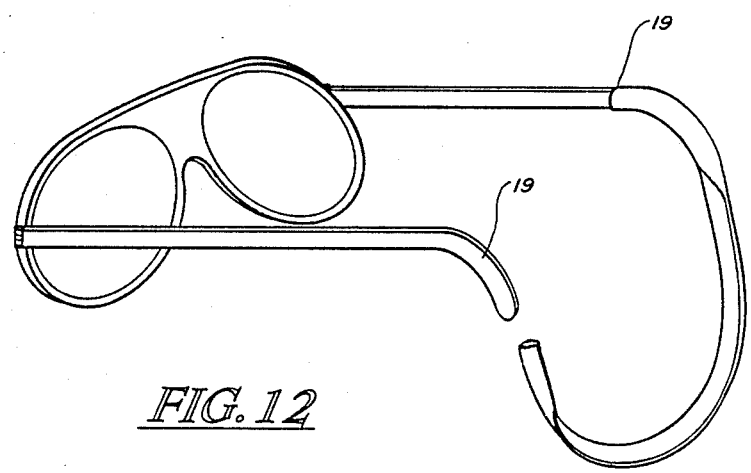
FIG. 12 is a perspective view of an eyeglass frame and the retainer of FIG. 11 attached to the frame.

In accordance with another embodiment, as seen in FIGS. 11 and 12, each tube 13 is sealed at its innermost end 17, which is the end opposite the longitudinally disposed end 18 of the band 10. This is typically performed by providing the sheet 14 with a length greater than the length of the tube 13 being formed. The sheet 14 is extended over the innermost end 17 and sealed to the band 10 at this point.

By sealing the innermost end 17 of the tube 13 the eyeglass frame stem will not be able to exit from the tube 13. Preferbly, the tube 13 is formed to have an inner length substantially equivalent to the length of the eyeglass frame ear piece bow, or equivalent portion of the eyeglass, as shown at 19 in FIG. 12. In this manner, only the earpiece bow can be positioned in tube 13. The retainer formed in this manner is precisely positioned on an eyeglass each time. This eliminates the problems with presently available eyeglass retainers where the wearer may pull the retainer on the eyeglasses too tight causing discomfort and headaches. The precise length of the now sealed tubes 13, interior 15, should be sufficient to envelope the ear piece bow 19. Typically, the tube 13 interior length will be about 2½ inches.

While the preferred embodiments have been described and illustrated, various substitutions or modifications may be made thereto without departing from the scope of the invention. Accordingly, it is to be understood that the invention has been described by way of illustration and not limitation.

What is claimed is:

1. An eyeglass retainer comprising:
   an elongated band formed from at least lengthwise stretchable material of sufficient length to extend about the back of the wearer's head, said band having opposite ends from which said band is configured to form tubular shaped members for a predetermined length: and
   a retention sheet formed from a material with dissimilar elasticity than said material from which said band is formed which is adhered to and along said predetermined length of said band formed as said tubular shaped members, said retention sheet is adhered to, thus constituting the junction of said tubular shaped members thereby holding said predetermined length of said band in said tubular shape; and whereby the material from which said band is made is sufficiently dissimilar in elasticity than the material from which said retention sheet is made to provide a cooperative interaction between these materials so that said tubular shaped members will grip an eyeglass frame passed therethrough.

2. The eyeglass retainer of claim 1 wherein said band is configured along said predetermined length to provide that said band longitudinal edges abut each other and are held in said abutting relation by the application of said retention sheet in forming said tubular shaped member.

3. The eyeglass retainer of claim 1 wherein said band is configured along said predetermined length to provide that said band longitudinal edges overlap and are held in said overlapping relation by the application of said retention sheet in forming said tubular shaped member.

4. The eyeglass retainer of claim 1 wherein said band is folded along said predetermined length to provide that said band longitudinal edges extend in a side by side co-planar relation and are held in said side by side co-planar relation by the application of said retention sheet in forming said tubular shaped members.

5. The eyeglass retainer of claim 1 wherein each of said tubular shaped members are open at both ends.

6. The eyeglass retainer of claim 1 wherein each of said retention sheets is adhered to that portion of said band adjacent to said tubular member's innerward most end for sealing said tubular member's innermost end.

* * * * *